(12) United States Patent
Kubo et al.

(10) Patent No.: US 8,478,925 B2
(45) Date of Patent: Jul. 2, 2013

(54) COMMUNICATION DEVICE, TELEVISION RECEIVER, AND REPRODUCTION DEVICE

(75) Inventors: Seiji Kubo, Osaka (JP); Akihiro Ebina, Kyoto (JP); Taku Matsuda, Nara (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/029,259

(22) Filed: Feb. 17, 2011

(65) Prior Publication Data
US 2011/0142022 A1    Jun. 16, 2011

Related U.S. Application Data

(63) Continuation of application No. PCT/JP2009/003888, filed on Aug. 13, 2009.

(30) Foreign Application Priority Data

Aug. 20, 2008    (JP) .................................. 2008-212005

(51) Int. Cl.
*G06F 13/14*    (2006.01)

(52) U.S. Cl.
USPC .............. 710/305; 710/22; 370/338; 370/463

(58) Field of Classification Search
None
See application file for complete search history.

(56) References Cited

U.S. PATENT DOCUMENTS

| | | | |
|---|---|---|---|
| 5,995,514 A | 11/1999 | Lo | |
| 6,985,451 B1 | 1/2006 | Nattiv et al. | |
| 7,539,142 B1 * | 5/2009 | Gurley et al. | 370/235 |
| 7,890,672 B2 * | 2/2011 | Kato | 710/22 |
| 7,991,937 B1 * | 8/2011 | Yin et al. | 710/305 |
| 2004/0067782 A1 * | 4/2004 | Kagan et al. | 455/575.1 |
| 2004/0168202 A1 * | 8/2004 | Ebihara | 725/133 |
| 2004/0180628 A1 | 9/2004 | Moriwaki et al. | |
| 2004/0238742 A1 * | 12/2004 | Mahvi | 250/338.3 |
| 2005/0062499 A1 * | 3/2005 | Magal et al. | 326/86 |

FOREIGN PATENT DOCUMENTS

| | | |
|---|---|---|
| JP | 5-159043 | 6/1993 |
| JP | 11-027277 | 1/1999 |
| JP | 2002-335502 | 11/2002 |
| JP | 2003-198578 | 7/2003 |
| JP | 2004-282204 | 10/2004 |
| JP | 2006-197062 | 7/2006 |
| JP | 2007-089028 | 4/2007 |
| JP | 2008-160197 | 7/2008 |

OTHER PUBLICATIONS

Partial English translation (paragraph [0070]) of JP 2002-335502, Nov. 2002.
Partial English translation (paragraphs [0016] and [0017]) of JP 5-159043, Jun. 1993.
International Search Report issued Sep. 29, 2009 in International (PCT) Application No. PCT/JP2009/003888.

* cited by examiner

*Primary Examiner* — Kibrom T Hailu
(74) *Attorney, Agent, or Firm* — Wenderoth, Lind & Ponack, L.L.P.

(57) ABSTRACT

A communication device includes: a wireless communication unit configured to perform data transmission and receiving with another communication device via a wireless network; and a communication control unit electrically connected with the wireless communication unit via a media independent interface (MII) bus and configured to control the wireless communication unit using a management data input-output/management data clock (MDIO/MDC) included in the MII bus.

4 Claims, 13 Drawing Sheets

FIG. 3

Management frame format

| | Preamble (32 bits) | start of frame (2 bits) | operation code (2 bits) | PHY Address (5 bits) | Register Address (5 bits) | Turnaround (2 bits) | Data (16 bits) | Idle |
|---|---|---|---|---|---|---|---|---|
| READ | 1....1 | 01 | 10 | AAAAA | RRRRR | Z0 | DD...DD | Z |
| WRITE | 1....1 | 01 | 01 | AAAAA | RRRRR | 10 | DD...DD | Z |

FIG. 4

| Register Address | Register Name | Basic / Extended |
|---|---|---|
| 0 | Control register | Basic |
| 1 | Status register | Basic |
| 2 | PHY identifier | Extended |
| 3 | | Extended |
| 4 | Auto Negotiation Advertisement | Extended |
| 5 | Auto Negotiation Link Partner Base Page Ability | Extended |
| 6 | Auto Negotiation Expantion | Extended |
| 7 | Auto Negotiation Next Page Transmit | Extended |
| 8 | Auto Negotiation Partner Received Next Page | Extended |
| 9 | MASTER-SLAVE Control register | Extended |
| 10 | MASTER-SLAVE Control register | Extended |
| 11-14 | Reserved | Extended |
| 15 | Extended status display | Reserved |
| 16-31 | Vender Specific | Extended |

FIG. 5

| bit | Name | Description (For PHY) | R/W | Description (Wireless Value mapping) | R/W |
|---|---|---|---|---|---|
| 0.15 | Reset | 1=PHY reset<br>0=normal operation | R/W SC | *mapping Wireless module reset<br>1=Wireless module reset<br>0=normal operation | R/W SC |
| 0.14 | Loopback | 1=enable loopback mode<br>0=disable loopback mode | R/W | *mapping Wireless module loopback mode<br>1=enable loopback mode<br>0=disable loopback mode | R/W |
| 0.13 | Speed Selection | 1=100 Mb/s<br>0=10 Mb/s | R/W | Read only (always 1) | RO |
| 0.12 | Auto-Negotiation Enable | 1=Enable Auto-Negotiation Process<br>0=Disable Auto-Negotiation Process | R/W | Read only (always 0) | RO |
| 0.11 | Power Down | 1=Power down<br>0=normal operation | R/W | *mapping Wireless module power down<br>1=Wireless module power down<br>0=normal operation | R/W |
| 0.10 | Isolate | 1=electrically Isolate PHY from MII<br>0=normal operation | R/W | *mapping Wireless module electrically Isolate<br>1=electrically Isolate PHY from MII<br>0=normal operation | R/W |
| 0.9 | Restart Auto-Negotiation | 1=Restart Auto-Negotiation Process<br>0=normal operation | R/W | Read only (always 0) | RO |
| 0.8 | Duplex Mode | 1=Full Duplex<br>0=Half Duplex | R/W | Read only (always 1) | RO |
| 0.7 | Collision Test | 1=enable COL signal test<br>0=disable COL signal test | R/W | Read only (always 0) | RO |
| 0.6:0 | Reserved | Write as 0, ignore on Read | R/W | Read only (always 0) | RO |

FIG. 6

| bit | Name | Description (For PHY) | R/W | Description (Wireless Value mapping) | R/W |
|---|---|---|---|---|---|
| 1.15 | 100BASE-T4 | 1 = PHY able to perform 100BASE-T4<br>0 = PHY not able to perform 100BASE-T4 | RO | Read only (always 0) | RO |
| 1.14 | 100BASE-TX Full Duplex | 1 = PHY able to perform full-duplex 100BASE-X<br>0 = PHY not able to perform full-duplex 100BASE-X | RO | Read only (always 1) | RO |
| 1.13 | 100BASE-TX Half Duplex | 1 = PHY able to perform half-duplex 100BASE-X<br>0 = PHY not able to perform half-duplex 100BASE-X | RO | Read only (always 0) | RO |
| 1.12 | 10 Mb/s Full Duplexb | 1 = PHY able to operate at 10 Mb/s in full-duplex mode<br>0 = PHY not able to operate at 10 Mb/s in full-duplex mode | RO | Read only (always 0) | RO |
| 1.11 | 10 Mb/s Half Duplex | 1 = PHY able to operate at 10 Mb/s in half-duplex mode<br>0 = PHY not able to operate at 10 Mb/s in half-duplex mode | RO | Read only (always 0) | RO |
| 1.10:7 | Reserved | Ignore when read | RO | Ignore when read | |
| 1.6 | MF Preamble Suppression | 1 = PHY will accept management frames with preamble suppressed.<br>0 = PHY will not accept management frames with preamble suppressed. | RO | Read only (always 0) | RO |
| 1.5 | Auto-Negotiation Complete | 1 = Auto-Negotiation process completed<br>0 = Auto-Negotiation process not completed | RO | Read only (always 0) | RO |
| 1.4 | Remote Fault | 1 = remote fault condition detected<br>0 = no remote fault condition detected | RO | Read only (always 0) | RO |
| 1.3 | Auto-Negotiation Ability | 1 = PHY is able to perform Auto-Negotiation<br>0 = PHY is not able to perform Auto-Negotiation | RO | Read only (always 0) | RO |
| 1.2 | Link Status | 1 = link is up<br>0 = link is down | RO | *mapping Wireless module link state<br>1=link is up<br>0=link is down | RO |
| 1.1 | Jabber Detect | 1 = jabber condition detected<br>0 = no jabber condition detected | RO | Read only (always 0) | RO |
| 1.0 | Extended Capability | 1 = extended register capabilities<br>0 = basic register set capabilities only | RO | Read only (always 0) | RO |

FIG. 13
Interrupt frequency when wireless
communication unit is selected
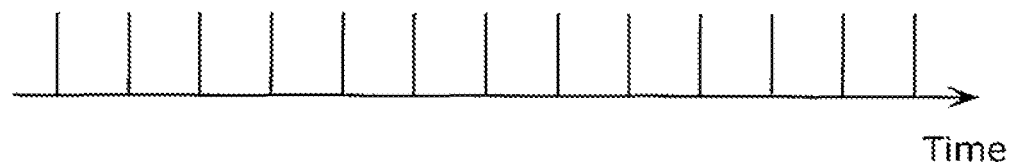
Time
Interrupt frequency when wireless
communication unit is not selected
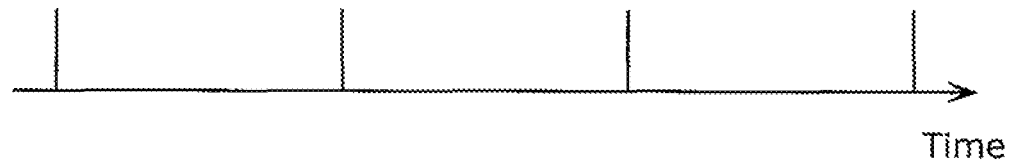
Time

COMMUNICATION DEVICE, TELEVISION RECEIVER, AND REPRODUCTION DEVICE

CROSS REFERENCE TO RELATED APPLICATION

This is a continuation application of PCT application No. PCT/JP2009/003888, filed on Aug. 13, 2009, designating the United States of America.

BACKGROUND OF THE INVENTION (1) Field of the Invention

The present invention relates to communication devices used for connection to a wireless local area network (LAN), and relates particularly to a content processing device connectable to the wireless LAN.

(2) Description of the Related Art

In recent years, developments in communication networks have created an environment in which multimedia information, including images, is readily accessible at home and offices via the Internet through various distribution services, as represented by High Definition Television (HDTV) and the like.

In the meantime, there is a worldwide proliferation of wireless LAN products compliant with IEEE 802.11a/b/g that is one of the wireless LAN standards. In addition, IEEE 802.11n, which is expected to enable even faster communication, is now under consideration. Communication with an AV apparatus, such as a TV, connected using a wireless LAN offers such convenience as eliminating the complication of routing the cable in the room and providing greater flexibility of where to place the apparatus.

Conventionally, there have been peripheral component interconnect (PCI) buses, universal serial buses (USBs), and so on as wireless modules that enable connection to the wireless LAN. Using such modules, personal computers (PCs), for example, can perform wireless LAN communication (see Japanese Unexamined Patent Application Publication No. 11-27277 (Patent Reference 1), for example).

SUMMARY OF THE INVENTION

However, unlike PCs, embedded devices such as TVs do not necessarily have many bus interfaces (IFs) such as a PCI and a USB. Redesigning of the LSI is required if a PCI bus or a USB port is to be provided to the TV or the like, although such redesigning is not realistic from the viewpoint of the development time and cost.

The present invention has been conceived in view of such a circumstance, and aims to provide a communication device connectable to the wireless LAN without significant modification, by efficiently using the existing resources of an AV apparatus.

The communication device according to an aspect of the present invention is a communication device which performs data communication with another communication device. More specifically, the communication device includes: a wireless communication unit configured to perform data transmission and receiving with the other communication device via a wireless network; and a communication control unit electrically connected with the wireless communication unit via a media independent interface (MII) bus, the communication control unit being configured to control the wireless communication unit using a management data input-output/management data clock (MDIO/MDC) included in the MII bus.

The MII bus is already included in many AV apparatuses as an interface for connection to a wired network. Thus, by connecting the wireless communication unit to the MII bus and controlling the wireless communication unit using the MDIO/MDC, connection to the wireless LAN is possible almost without making the communication control unit perform processing unique to the wireless communication.

The wireless communication unit includes a register used for the control performed by the communication control unit. The register may include a common region and a special region, the common region being used for processing common to wired communication and wireless communication, and the special region being used for processing unique to the wireless communication.

More specifically, the register mapping is commonalized for the processing common with the conventional wired communication unit, whereas for the processing unique to the wireless communication, a register (special region) different from the register used for the common processing (common region) is used. This allows use of the existing software for the common processing, and thus software development is necessary only for the processing unique to the wireless communication. As a result, the development time and cost can be reduced.

The register includes: a first register including (i) the common region and (ii) an intermediate region which mediates transmission of a processing request from the communication control unit to the special region; and a second register including the special region. The communication control unit may be configured to indirectly access the special region via the intermediate region.

The number of parameters necessary for controlling the wireless communication unit is greater than that for the wired communication unit, which causes a problem that having only the first register is insufficient in some cases to hold all the parameters. Such a problem can be solved without significant modification to the existing software, by making the second register hold some (or all) of the parameters unique to the wireless communication unit and using a free region of the first register (a region other than the common region) as an intermediate region for accessing the second register.

For example, the common region is used for at least one of setting for reset, setting for loopback, setting for power-down, setting for an isolation function, and setting for status of link with an external device.

Data transmission and receiving between the communication control unit and the wireless communication unit is performed using a data communication bus included in the MII bus.

The communication device further includes a wired communication unit electrically connected with the communication control unit via the MII bus, the wired communication unit being configured to perform data transmission and receiving with the other communication device via a wired network. The communication control unit may be configured to select one of the wired communication unit and the wireless communication unit, communicate with the other communication device using the selected communication unit, and perform control so that the unselected communication unit is electrically disconnected from the communication control unit on the data communication bus included in the MII bus.

With the above configuration, it is possible to flexibly change the mode of connection with the network according to the usage and circumstance. For instance, the wired communication unit may be selected when the communication device is used in an environment where the wireless communication status is unfavorable, whereas the wireless communication unit may be selected when the communication device is used in an environment where the wireless communication can be stably performed.

The communication control unit may be configured to put, in a high impedance state, at least an output terminal of the data communication bus for the unselected communication unit, so as to electrically disconnect the data communication bus and cause an input terminal to ignore input data. In addition, the data communication bus for the unselected communication unit may be electrically disconnected using a switch. This switch may be a mechanical switch or a semiconductor switch such as a switch transistor.

Each of the wired communication unit and the wireless communication unit includes a connection status switching unit configured to switch between (i) a connected status which is a status of being electrically connected with the communication control unit via the data communication bus, and (ii) a disconnected status which is a status of being electrically disconnected with the communication control unit. The communication control unit may further include a line selecting unit configured to exclusively select one of the wired communication unit and the wireless communication unit by transmitting (i) a connection instruction to the connection status switching unit of one of the wired communication unit and the wireless communication unit via the MDIO/MDC and (ii) a disconnection instruction to the connection status switching unit of the other one of the wired communication unit and the wireless communication unit via the MDIO/MDC.

The communication control unit may be configured to: communicate with the other communication device using the wired communication unit when the wired communication unit is connectable with the other communication device; and communicate with the other communication device using the wireless communication unit when the wired communication unit is not connectable with the other communication device and the wireless communication unit is connectable with the other communication device. This allows the wired communication unit, which can perform stable communication, to be preferentially used.

The wireless communication unit further includes an interrupt requesting unit configured to transmit a request for a processing interrupt to the communication control unit. The communication control unit may further include an interrupt regulating unit configured to regulate the processing interrupt upon selecting the wired communication unit, by transmitting an interrupt regulation instruction to the interrupt requesting unit via the MDIO/MDC.

It is unnecessary to immediately respond to the interrupt request from the wireless communication unit when the wired communication unit is selected, that is, when data transmission and receiving is being performed with the external device via the wired communication unit. Rather, when the wireless communication status is unfavorable and so on, there is a possibility that the interrupt request notifying link-up and link-down frequently occurs, causing a delay of the original processing of the communication control unit. In view of this, it is preferable to regulate the processing interrupt as described above when the wireless communication unit is not in use.

The wired communication unit and the wireless communication unit may be included in the same semiconductor integrated circuit (Large Scale Integration: LSI) and be connected with the communication control unit via an instruction assigning unit configured to assign, to one of the wired communication unit and the wireless communication unit, an instruction transmitted from the communication control unit via the MDIO/MDC.

Each of the communication control unit and the wireless communication unit may include a communication traffic adjusting unit configured to transmit a transmission stop instruction to the other communication traffic adjusting unit via the data communication bus included in the MII bus, the transmission stop instruction being an instruction to stop the data transmission performed via the data communication bus.

The communication rate between the wireless communication unit and the access point (hereinafter referred to as "external communication rate") fluctuates. Therefore, when the external communication rate exceeds the communication rate between the communication control unit and the wireless communication unit (hereinafter referred to as "internal communication rate"), the communication control unit could possibly become unable to receive all data from the wireless communication unit and end up discarding frames. On the other hand, when the external communication rate falls below the internal communication rate, the wireless communication unit could possibly become unable to receive all data from the communication control unit and end up discarding frames. To address this, it is preferable to adjust the communication traffic by transmitting the "transmission stop instruction" in such cases. Note that anything may be used as the "transmission stop instruction" as long as it is control data that instructs a stop of the data transmission, such as a pause frame exchanged between the conventional wired communication unit and an external communication device.

The television receiver according to an aspect of the present invention is a television receiver connectable to a network, and includes: the communication device above; and a display unit configured to display content obtained from the other communication device via the communication device.

The reproduction device according to an aspect of the present invention is a reproduction device connectable to a network, and includes: the communication device above; and a reproducing unit configured to reproduce content obtained from the other communication device via the communication device.

The wireless communication unit includes a register used for the control performed by the communication control unit. The register may include: a first register including an intermediate region which mediates transmission of a processing request from the communication control unit; and a second register including a special region used for wireless communication processing. The communication control unit may be configured to indirectly access the special region via the intermediate region.

The present invention is widely applicable to, other than the television receiver and the reproduction device, a content processing device, such as a recording device, which obtains content via a network and processes (displays, reproduces, records, and so on) the content.

According to the present invention, it is possible to provide a communication device connectable to the wireless LAN without significant modification, by efficiently using the existing resources of an AV apparatus.

FURTHER INFORMATION ABOUT TECHNICAL
BACKGROUND TO THIS APPLICATION

The disclosure of Japanese Patent Application No. 2008-212005 filed on Aug. 20, 2008 including specification, drawings and claims is incorporated herein by reference in its entirety.

The disclosure of PCT application No. PCT/JP2009/003888, filed on Aug. 13, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing a format of a frame transmitted and received via an MDIO/MDC;

FIG. 4 is a diagram showing mapping of a first register;

FIG. 5 is a diagram showing mapping of a control register in FIG. 4;

FIG. 6 is a diagram showing mapping of a status register in FIG. 4;

FIG. 13 is a diagram showing the frequency of interrupt request when a wireless communication unit is selected (upper half) and when the wireless communication unit is not selected (lower half).

DESCRIPTION OF THE PREFERRED EMBODIMENT(S)

Hereinafter, preferred embodiments of the present invention shall be described with reference to the drawings.

Figure 1:
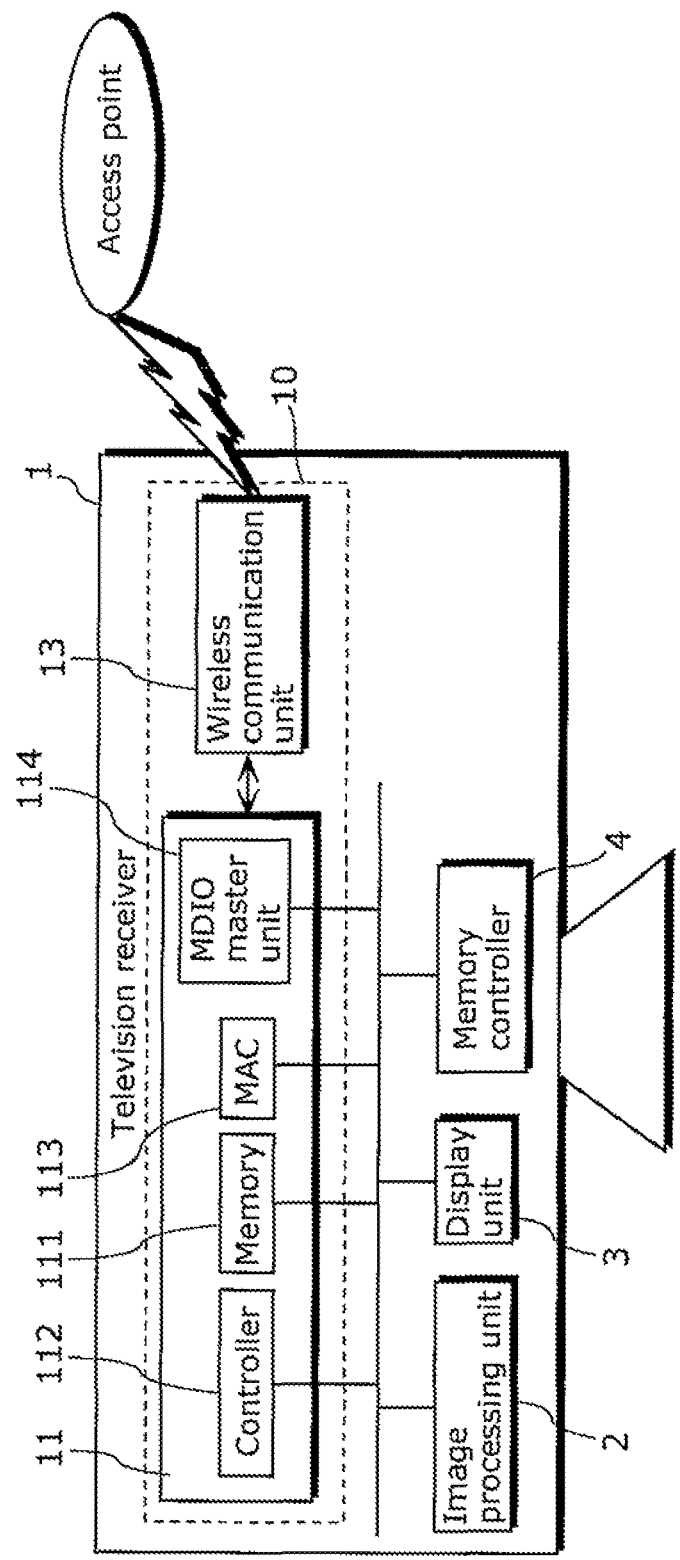
FIG. 1 is a schematic block diagram of a television receiver according to an embodiment of the present invention.

FIG. 1 is a schematic block diagram of a television receiver 1 (hereinafter referred to as "television 1") as an example of an AV apparatus which includes a communication device 10 according to an embodiment of the present invention. As shown in FIG. 1, the television 1 mainly includes a controller (also referred to as "central processing unit (CPU)") 112, an image processing unit 2, a display unit 3, a memory controller 4, a memory 111, a media access control (MAC) 113, a management data input/output (MDIO) master unit 114, and a wireless communication unit 13. The controller 112 is connected to the image processing unit 2, the display unit 3, the memory controller 4, the memory 111, the MAC 113, and the MDIO master unit 114 via a bus. The communication device 10 includes: the wireless communication unit 13; and a communication control unit 11 including the controller 112, the memory 111, the MAC 113, and the MDIO master unit 114.

The image processing unit 2 decodes video data downloaded from broadcast waves or a network, and displays the decoded video data on the display unit 3. The display unit 3 displays video, and can be implemented by a cathode-ray tube, a liquid crystal display (LCD), a plasma display panel (PDP), an organic electro-luminescence (OEL) display, or the like. The memory controller 4 controls the interface of the memory 111, such as data reading and writing by the memory 111 and memory refresh in the case of a dynamic random access memory (DRAM).

The television 1 decodes, in the image processing unit 2, broadcast waves received by an antenna (not shown), and displays the decoded broadcast waves on the display unit 3. In addition, the television 1 is connected to a network through a wireless connection between the wireless communication unit 13 and an access point 5. This allows, for example, video data downloaded from the Internet to be decoded by the image processing unit 2 and displayed on the display unit 3, and so on.

Hereinafter, the communication device 10 included in the television 1 shall be described as an embodiment.

First Embodiment

A first embodiment is based on an assumption of using, as the communication medium of a wireless communication path, a wireless LAN compliant with the IEEE 802.11 standard. Note that the communication standard used for the wireless LAN is not limited to this, and any standard may be used as long as it is a communication standard for the communication medium of the wireless communication path.

Figure 2:
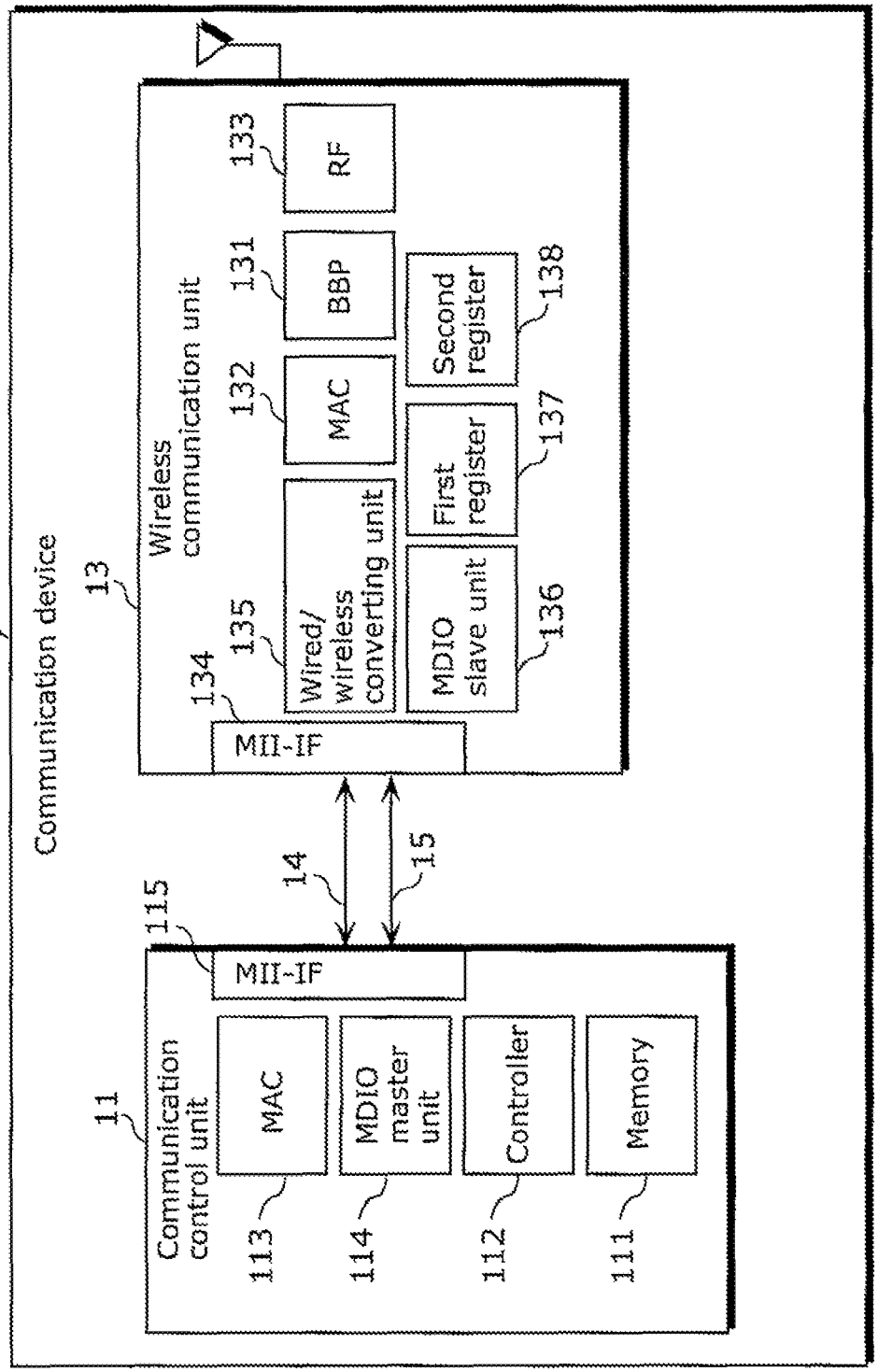
FIG. 2 is a schematic diagram of a communication device according to an embodiment of the present invention.

Hereinafter, a configuration of a communication device according to the first embodiment of the present invention shall be described with reference to the drawings. FIG. 2 is a schematic diagram illustrating the outline of the communication device 10 capable of communication through connection to the wireless LAN according to the first embodiment.

The communication device 10 according to the first embodiment of the present invention includes: the communication control unit 11; the wireless communication unit 13 connectable to the wireless LAN that is equivalent to a wireless module, for example; and a media independent interface (MII) bus which includes a data communication bus 14 and a management data input-output/management data clock (MDIO/MDC) 15 (control bus).

The communication control unit 11 exchanges control information with the wireless communication unit 13 via the MDIO/MDC 15. In addition, the communication control unit 11 is configured to communicate with an external device via the wireless LAN using the wireless communication unit 13.

The communication control unit 11 includes the memory 111, the controller 112, the media access control (MAC) 113, the MDIO master unit 114, and an MII-IF 115.

The memory 111 is a memory used when the communication control unit 11 performs control. Any memory, such as a dynamic random access memory (DRAM), a synchronous dynamic random access memory (SDRAM), a flash memory, or a ferroelectric memory, may be used as the memory 111 as long as it can record data.

The controller 112 controls the operation of the communication device 10 as a whole by controlling the operation of the wireless communication unit 13 via the MDIO/MDC 15. The controller 112 can be implemented by a semiconductor element or the like. In addition, the controller 112 may be configured only with hardware, or with a combination of hardware and software. The controller 112 can be implemented by a microcomputer.

The MAC 113 is an MAC which handles a frame compliant with the IEEE 802.3 standard, and the MDIO master unit 114 performs control in compliance with the IEEE 802.3 standard via the MDIO/MDC. The MII-IF 115 is an interface (IF) connectable to the data communication bus 14 and the MDIO/MDC 15.

The wireless communication unit 13 communicates, using the wireless LAN, with the external device connected via the network. The wireless communication unit 13 includes: a baseband processing unit 131 which performs baseband processing; an MAC 132; an RF 133 which performs radio-frequency processing; an MII-IF 134 which is an IF connectable to the data communication bus 14 and the MDIO/MDC 15; a wired/wireless converting unit 135 which converts a frame compliant with the IEEE 802.11 standard into a frame compliant with the IEEE 802.3 standard, and vice versa; an MDIO slave unit 136 which operates according to the control performed by the MDIO master unit 114 via the MDIO/MDC 15; and first and second registers 137 and 138 which hold control information.

The MII bus includes: the data communication bus 14 used for data transmission and receiving between the television 1 and another communication device on the network; and a control bus (referred to as the "MDIO/MDC 15") used for exchange of control information between the communication control unit 11 and the wireless communication unit 13.

The data communication bus 14 is a communication path used for data transmission and receiving between the communication control unit 11 and the wireless communication unit 13, and includes the following data lines compliant with the IEEE 802.3 standard: TX_ER, TX_EN, TXD0-3, and TX_CLK for transmission; RXD0-3, RX_DV, RX_CLK, and RX_ER for receiving; and COL and CRS for half-duplex control. However, not all of these data lines are necessary. For example, COL and CRS, which are data lines for half-duplex control, are unnecessary in the case of not performing half-duplex communication.

The MDIO/MDC 15 is a signal line for passing signals of the management data input-output (MDIO) and the management data clock (MDC) compliant with the IEEE 802.3 standard, and is a signal line that allows the communication control unit 11, which is the control host, and the wireless communication unit 13, which is the control slave, to exchange information in accordance with a management frame format (referred to as "MDIO management frame") shown in FIG. 3.

With reference to FIG. 3, each field of the MDIO management frame shall be described.

"Preamble" has fixed bits for synchronization, and "1" is set to all 32 bits. "start of frame" is a field indicating the start of a frame, and "01" is set. "operation code" indicates the details of an operation. For example, "10" is set in the case of a read instruction, and "01" is set in the case of a write instruction. "PHY Address" indicates a physical address of a destination to which the MDIO management frame is transmitted. For example, the PHY address of the wireless communication unit 13 is set when the communication control unit 11 controls the wireless communication unit 13. "Resister Address" indicates a register address. When the communication control unit 11 accesses the first register 137 of the wireless communication unit 13, for example, a corresponding register address is set. "Turnaround" is allocated with two bits. When the communication control unit 11 is to perform a read operation, for example, high impedance is set to the first bit, and "1" is set to the second bit by the wireless communication unit 13 serving as the slave. In addition, when the communication control unit 11 is to perform a write operation, the communication control unit 11 serving as the master sets "1" to the first bit and "0" to the second bit. Data is set to "Data" when a write instruction or a read instruction is responded, for example. "Idle" indicates an idling status in which no communication is performed between the communication control unit 11 and the wireless communication unit 13 via the MDIO, and high impedance is set.

Next, a configuration of the first register 137 shall be described with reference to FIG. 4. Note that "Register Address 601 (hereinafter referred as "address")" in FIG. 4 indicates an address of a register. "Register Name 602" indicates the details to be set to a corresponding register. In addition, "Basic/Extended 603" indicates whether the corresponding register address is a "basic item (indicated as "Basic")", an "extended item (indicated as "Extended")", or a "reserved item (indicated as "Reserved")" in the register mapping used for the conventional wired communication unit (referred to as "wired PHY").

First, the control over the wireless communication unit 13 via the MDIO/MDC includes processing common with the control over the wired PHY and processing unique to the wireless communication unit 13. Thus, as for the addresses 0 to 15 of the first register 137, the register mapping conventionally used for the wired PHY is used without any change (this region is referred to as a "common region"). On the other hand, the addresses 16 to 31 not used for the conventional wired PHY are used for the processing unique to the wireless communication (this region is referred to as a "special region"). However, some or all of the extended items (addresses 2 to 15) may be used as the special region. In addition, all of the addresses 0 to 32 may be used as the special region without regard to the mapping of the conventional wired PHY.

According to the above configuration, the communication control unit 11 is capable of controlling the wireless communication unit 13 via the MDIO/MDC only, and data communication between the communication control unit 11 and the wireless communication unit 13 can be performed via the data communication bus 14. That is to say, the communication control unit 11 and the wireless communication unit 13 can be connected using the MII bus conventionally included in the television 1 for the wired connection. As a result, it is possible to connect the television 1 to the wireless LAN using the existing resources without providing a new interface such as a PCI bus by redesigning the LSI, and so on.

The wireless communication unit 13 converts, using the wired/wireless converting unit 135, the format of data transmitted and received. More specifically, between the wireless communication unit 13 and the access point 5, data is transmitted and received in frames compliant with the IEEE 802.11 standard, whereas between the communication control unit 11 and the wireless communication unit 13, data is transmitted and received in frames compliant with the IEEE 802.3 standard. This allows the communication control unit 11 to transmit and receive data via the data communication bus 14 in the same manner as in the conventional wired communication without regard to the fact the communication is wireless communication. This, as a result, makes it possible to use the software processing by which the wired PHY has been conventionally connected.

In addition, the communication control unit 11 can exchange control information with the wireless communication unit 13 via the MDIO/MDC 15. As a result, the wireless communication unit 13 can be controlled using the control information exchange program of the system to which the conventional wired PHY has been connected.

Next, with reference to FIG. 5 and FIG. 6, the details of the register mapping of the common region of the first register 137, particularly the register mapping of the addresses 0 and 1, shall be described.

FIG. 5 is a diagram illustrating an example of bit allocation for a control register having the address 0 shown in FIG. 4 when the wireless communication unit 13 is used. A control register table 700 shown in FIG. 5 includes: bit allocation 701; a register name 702 for each bit; a function description 703 in the wired PHY; a read/write attribute 704 in the wired PHY; a function description 705 when used in the wireless communication unit 13; and a read/write attribute 706 when used in the wireless communication unit 13. For example, it is indicated that the bit 0.15 is allocated with a parameter of a function to reset the wireless communication unit 13 as well as a function to reset the wired PHY. Similarly, the bit 0.14 is allocated with a function for loopback of a frame in the wireless communication unit 13, the bit 0.11 is allocated with a function for powering down the wireless communication unit 13, the bit 0.10 is allocated with an isolation function for electrically separating the wireless communication unit 13 connected via an MII connecting unit. The other bits in 701 constantly have a unique value in this example.

FIG. 6 is a diagram illustrating an example of bit allocation for a status register having the address 1 shown in FIG. 4 when the wireless communication unit 13 is used. A status register table 800 shown in FIG. 6 includes: bit allocation 801; a register name 802 for each bit; a function description 803 in the wired PHY; a read/write attribute 804 in the wired PHY; a function description 805 when used in the wireless communication unit 13; and a read/write attribute 806 when used in the wireless communication unit 13. For example, although the bit 1.2 has a function used for indicating whether or not the wired PHY is linked up with an external communication device, the bit 1.2, when used in the wireless communication unit 13, is allocated so that this function is used for indicating whether or not the wireless communication unit 13 is linked up with the access point that is the external communication device, as in the case of the wired PHY. The other bits in 801 constantly have a unique value in this example.

As described above, for functions that are related between the wired PHY and the wireless communication unit 13, the registers are configured in the same manner. This allows the communication control unit 11 to control the wireless communication unit 13 with regard to such functions, using the same control method as when the conventional wired PHY is used.

In addition, the communication control unit 11 can exchange control information with the wireless communication unit 13 via the MDIO/MDC 15, and the settings of the register control which were used in the conventional wired PHY can be partially used, thereby enabling control over the wireless communication unit 13 by further using the control information exchange program of the system to which the conventional wired PHY has been connected.

Figure 7:
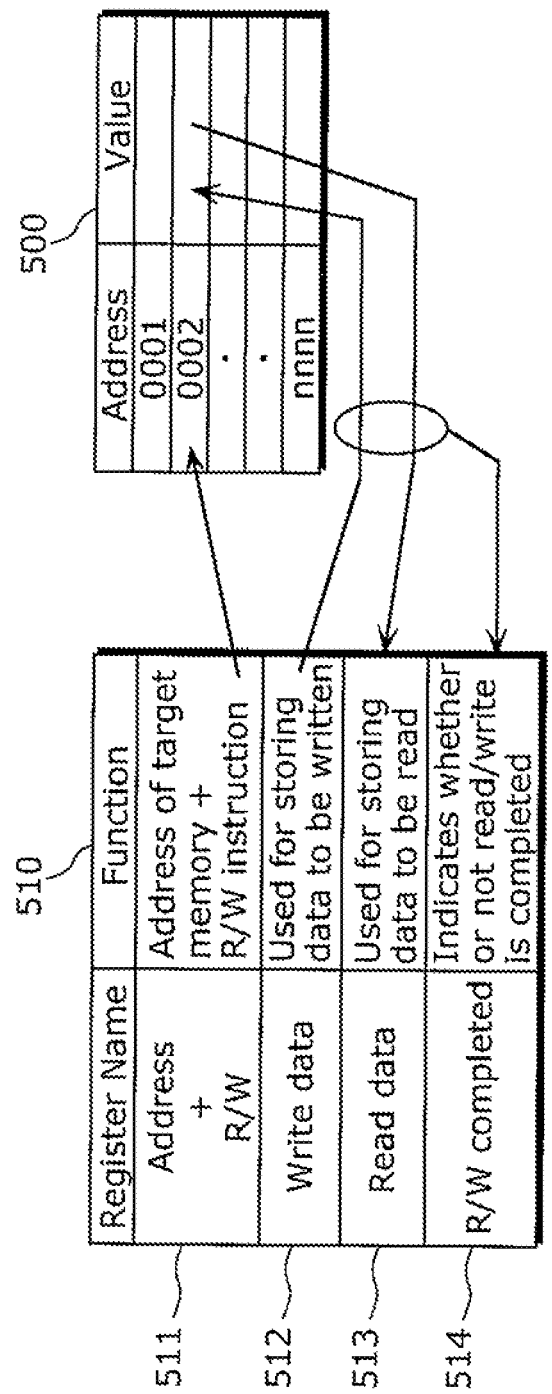
FIG. 7 is a diagram showing a configuration example of first and second registers that allow a communication control unit to gain indirect access.
Figure 8:
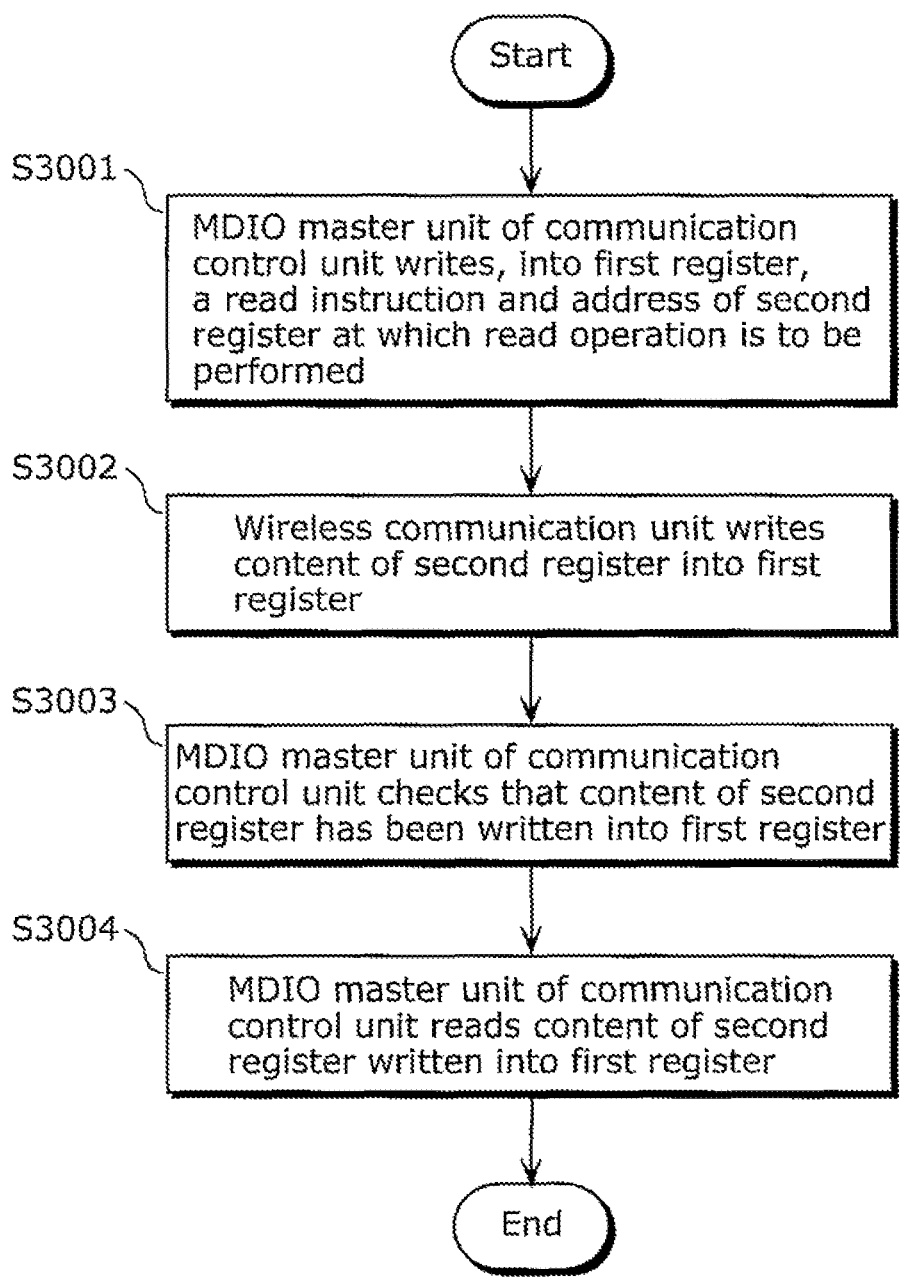
FIG. 8 is a flowchart showing an operation of a communication control unit performed for indirectly reading information in a second register of a wireless communication unit using an MDIO master unit.
Figure 9:
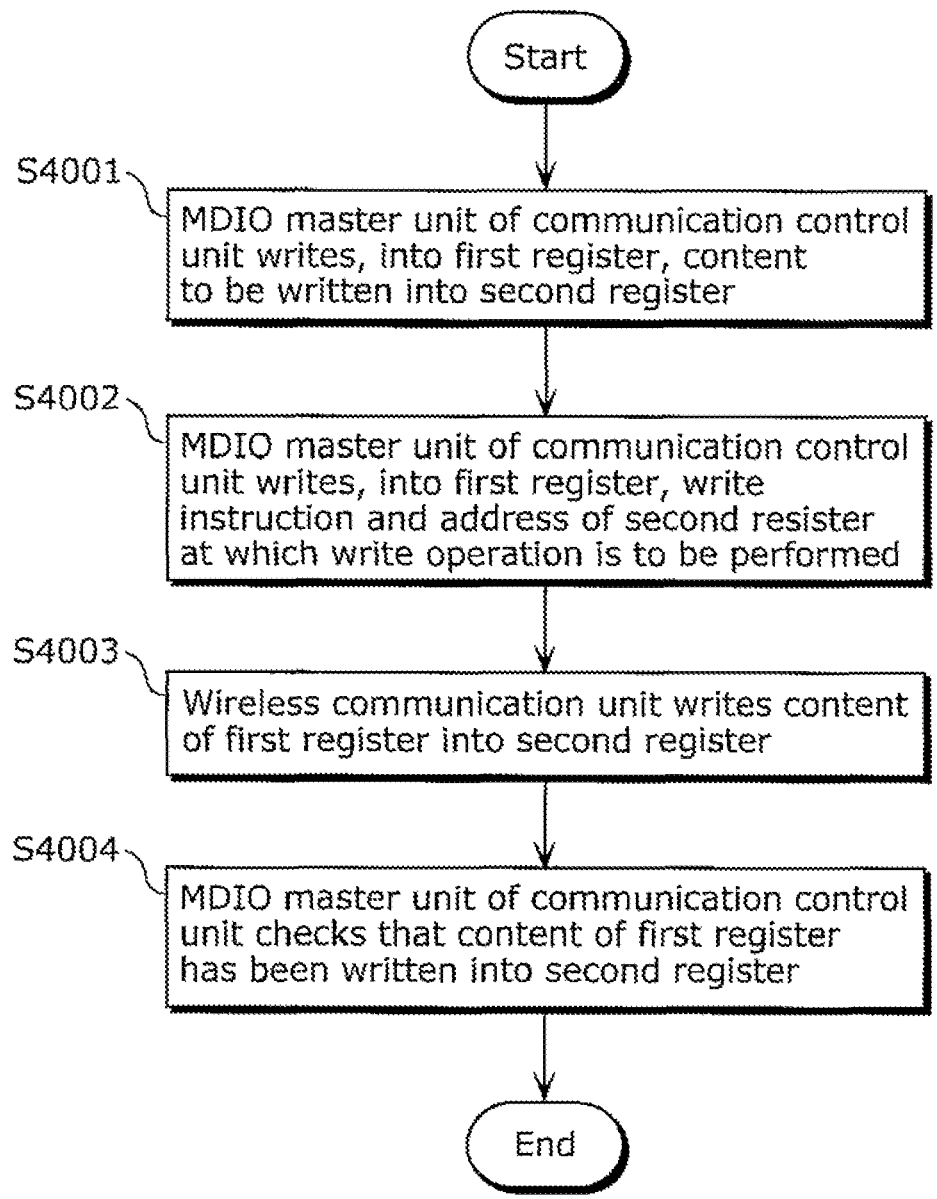
FIG. 9 is a flowchart showing a method by which a communication control unit indirectly writes information into a second register of a wireless communication unit using an MDIO master unit.

With the above configuration, 16 registers (addresses 16 to 31) are used when the MDIO master unit 114 and the MDIO slave unit 136 exchange information in a manner unique to the wireless communication in accordance with the MDIO management frame. However, when using a group of 16 registers as above, there is a possibility that not all the information necessary for the wireless control can be held. In such a case, for example, control information is separately held in the second register 138, and the communication control unit 11 indirectly controls the second register 138 via the first register 137 to exchange the control information with the second register 138 as shown in FIGS. 7 to 9. This makes it possible to adequately address the problem of not being able to hold all the necessary data, even when there is a large amount of control information.

FIG. 7 is a diagram showing register configurations that allow the communication control unit 11 to indirectly access the second register 138 via the first register 137. As shown in FIG. 7, of the address 16 to 31 of the first register 137, four registers 511 to 514 (the register indicated by the reference numeral 510 in FIG. 7) are used as an intermediate region which mediates transmission of a processing request from the communication control unit 11 to the second register 138, and the other registers are used as a first special region (not shown) for the processing unique to the wireless communication. Whereas, a register 500 shown in FIG. 7 is included in the second register 138 and used as a second special region for the processing unique to the wireless communication.

The register 511 is a register which holds an address of the second register 138 and a read instruction to be conducted in Step S3001 in FIG. 8 and an address of the second register 138 and a write instruction to be conducted in Step S4002 in FIG. 9. The register 512 is a register which holds content to be written in Step S4001 in FIG. 9. The register 513 is a register for writing content of the second register 138 in Step S3002 in FIG. 8. The register 514 is a register used in Step S3003 in FIG. 8 and Step S4004 in FIG. 9 for indicating whether or not a read/write operation is completed.

Hereinafter, with reference to FIG. 8, an example in which the communication control unit 11 indirectly reads information in the second register 138 of the wireless communication unit 13 using the MDIO master unit 114 shall be described.

(Step S3001) First, the MDIO master unit 114 of the communication control unit 11 writes, into the first register 137, a read instruction and an address of the second register 138 at which a read operation is to be performed.

More specifically, the communication control unit 11 sets the following information to the items of the MDIO management frame shown in FIG. 3: "10 (read instruction)" is set to "operation code"; the PHY address of the wireless communication unit 13 is set to "PHY Address"; an address of the first register 137 corresponding to the register 511 in FIG. 7 is set to "Register Address"; and a read instruction and an address of the second register 138 at which a read operation is to be performed are set to "Data". Then, the communication control unit 11 transmits the MDIO management frame set in the above manner, to the wireless communication unit 13 via the MDIO/MDC 15. Having received this MDIO management frame, the wireless communication unit 13 writes, into the register 511, the information set to "Data", that is, the read instruction and the address of the second register 138 at which the read operation is to be performed.

(Step S3002) Next, the wireless communication unit 13 writes, into the register 513 of the first register 137, the content of the second register 138 as requested in Step S3001 in FIG. 8. In addition, the wireless communication unit 13 writes into the register 514 that the read instruction is completed.

(Step S3003) Subsequently, the MDIO master unit 114 of the communication control unit 11 checks, with reference to the register 514 of the first register 137 indicating that the read operation is completed, that the desired content of the second register 138 has been written into the first register 137. More specifically, the wireless communication unit 13 transmits, to the communication control unit 11 via the MDIO/MDC 15, the MDIO management frame in which "Data" is set with the information written into the register 514 indicating that the read operation is completed.

(Step S3004) Next, the MDIO master unit 114 of the communication control unit 11 reads the desired content of the second register 138 written into the register 513 of the first register 137, and terminates the operation. More specifically, the wireless communication unit 13 transmits, to the communication control unit 11 via the MDIO/MDC 15, the MDIO management frame in which "Data" shown in FIG. 3 is set with the content of the register 513.

Next, with reference to FIG. 9, an example in which the communication control unit 11 indirectly writes information into the second register 138 of the wireless communication unit 13 using the MDIO master unit 114 shall be described.

(Step S4001) First, the communication control unit 11 writes, into the register 512 of the first register 137, content which the MDIO master unit 114 is to write into the second register 138. More specifically, the communication control unit 11 sets the following information to the items shown in FIG. 3: "01 (write instruction)" is set to "operation code"; the PHY address of the wireless communication unit 13 is set to "PHY Address"; an address of the first register 137 corresponding to the register 512 in FIG. 7 is set to "Register Address"; and the content to be written into the second register 138 is set to "Data". Then, the communication control unit 11 transmits the MDIO management frame set in the above manner, to the wireless communication unit 13 via the MDIO/MDC 15. Having received this MDIO management frame, the wireless communication unit 13 writes, into the register 512, the content which is to be written into the second register 138 and has been set to "Data".

(Step S4002) Next, the communication control unit 11 writes, into the register 511 of the first register 137, a write instruction and an address of the second register 138 at which the MDIO master unit 114 wishes to perform the write operation. More specifically, the communication control unit 11 sets the following information to the items shown in FIG. 3: "01 (write instruction)" is set to "operation code"; the PHY address of the wireless communication unit 13 is set to "PHY Address"; an address of the first register 137 corresponding to the register 511 in FIG. 7 is set to "Register Address"; and a write instruction and an address of the second register 138 at which the write operation is to be performed are set to "Data". Then, the communication control unit 11 transmits the MDIO management frame set in the above manner, to the wireless communication unit 13 via the MDIO/MDC 15. Having received this MDIO management frame, the wireless communication unit 13 writes, into the register 511, the write instruction and the address of the target memory (value of the address of the second register 138 at which a write operation is to be performed and which has been set to "Data").

(Step S4003) Subsequently, the wireless communication unit 13 writes the content of the register 512 of the first register 137 as requested in Step S4001, at the address of the second register 138 designated by the register 511 of the first register 137 in Step 4002. In addition, the wireless communication unit 13 writes, into the register 514, that the write instruction is completed.

(Step S4004) Next, with reference to the register 514 of the first register 137 indicating that the write operation is completed, the MDIO master unit 114 of the communication control unit 11 checks that the desired content has been written into the second register 138, and terminates the operation.

The above configuration allows the communication control unit 11 to obtain (read) and change (write) the control information held in the second register 138 of the wireless communication unit 13. In addition, since this processing is performed using a region different from the common region (the addresses 0 to 15 in FIG. 4), no modification to the existing software (program for accessing the common region) is necessary, and it is sufficient as long as processing for accessing the special region is added. As a result, the development time and cost can be reduced.

Note that an example of the information to be exchanged is control information related to wireless communication, indicating, for example: whether the wireless communication unit 13 is linked up or down with the external device via the wireless LAN; information on a cause of interrupt; which mode of the IEEE 802.11a/b/g/n is to be used; RSSI indicating receiving sensitivity; the antenna level for displaying the reception strength represented by the number of bars of antenna; SNR; PHY rate; ch; ESSID; MAC address; frequency band; encrypting information; statistical information; information set for analog front end; whether or not an antenna is used; selection of a transmission bandwidth of either 20M or 40M; settings of guard interval (GI); aggregation (ON/OFF/threshold); information on a wireless access point to which the wireless communication unit 13 is to be connected; or the like.

Among these pieces of information, frequently-obtained information such as the following is preferably held in the first register 137 (the first special region): information necessary for displaying the antenna level such as the receiving sensitivity; and link information indicating the connection status of the communication device 10. This increases the processing speed of the communication control unit 11. The other pieces of information, such as the information obtained only at the time of activation, may be held in the second register 138 (the second special region).

Second Embodiment

In the first embodiment, the communication device 10 has been described in which the communication control unit 11 and the wireless communication unit 13 can exchange the control information via the MDIO/MDC 15. In a second embodiment, a communication device 20 shall be described which is extended from the communication device 10 of the first embodiment to be connectable to a wired LAN in addition to the wireless LAN.

Figure 10:
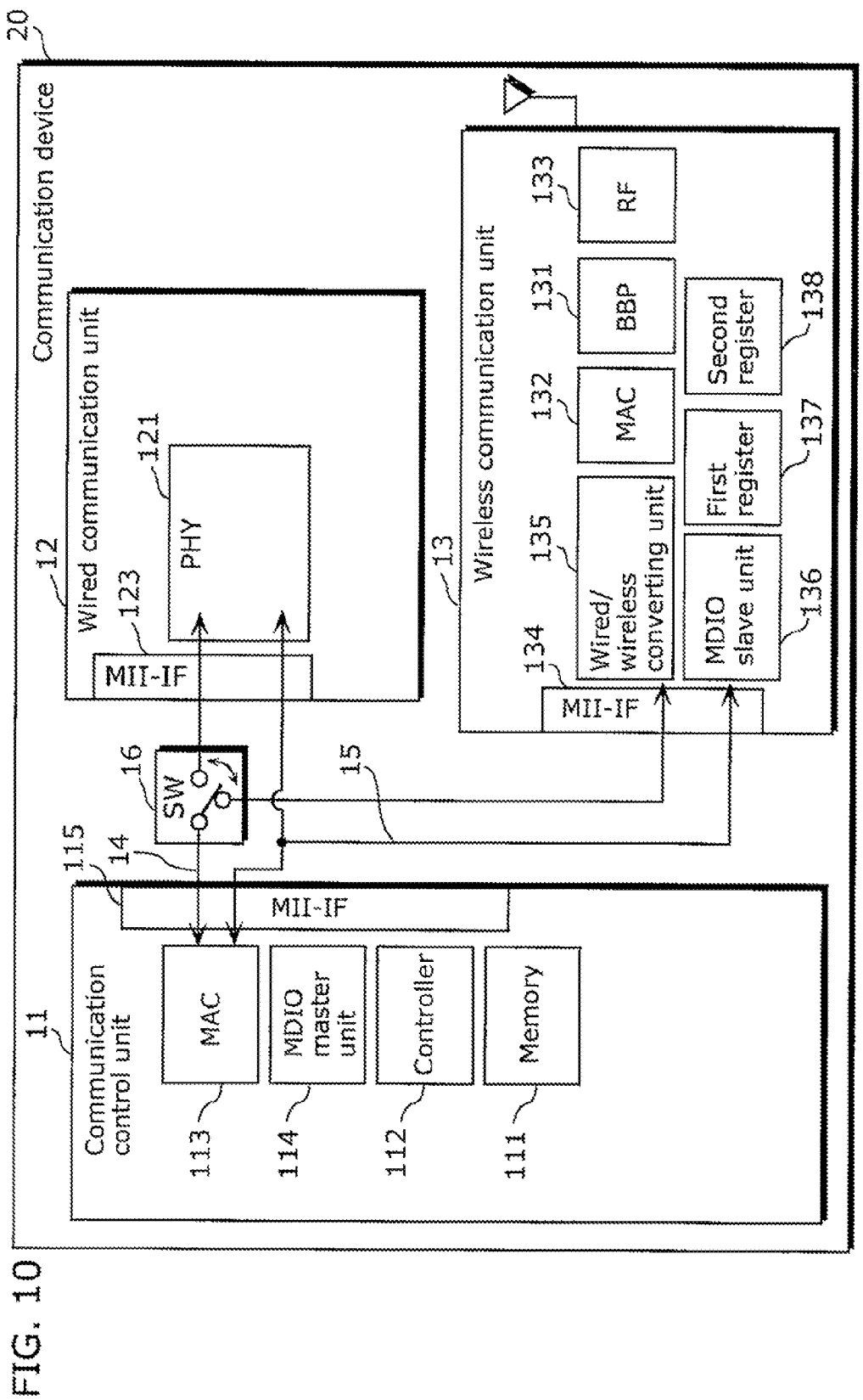
FIG. 10 is a schematic diagram of a communication device according to another embodiment of the present invention.

Hereinafter, a configuration of the communication device 20 according to the second embodiment of the present invention shall be described with reference to FIG. 10. FIG. 10 is a schematic diagram illustrating the outline of the communication device 20 in which the communication control unit 11 is connected to both a wired communication unit 12 and the wireless communication unit 13 via the MII bus (that is, the "data communication bus 14" and the "MDIO/MDC 15") and is capable of using these communication units while electrically switching between them.

The communication device 20 according to the second embodiment of the present invention includes the communication control unit 11, the wired communication unit 12, the wireless communication unit 13, the data communication bus 14, the MDIO/MDC 15, and a switch 16. Note that the constituent elements having the same configuration as those in the first embodiment are given the same reference numerals, and the descriptions thereof shall not be repeated.

The communication control unit 11 exchanges the control information with the wired communication unit 12 and the wireless communication unit 13 via the MDIO/MDC 15. In addition, the communication control unit 11 selects one of the wired communication unit 12 and the wireless communication unit 13 based on the control information, and communicates with the external device via the network using the selected communication unit. Here, the communication control unit 11 controls the switch 16 so that the unselected communication unit is electrically disconnected from the communication control unit 11 on the data communication bus 14.

The wired communication unit 12 communicates, using the wired LAN, with the external device connected via the network. The wired communication unit 12 includes a PHY 121 and an MII-IF 123 capable of connecting the MII bus and the PHY 121. Note that the PHY 121 exchanges the control information with the communication control unit 11 via the MDIO/MDC 15. In addition, the PHY 121 relays, via the data communication bus 14, data transmitted and received between the communication control unit 11 and the external device.

The switch 16 switches, for the data communication bus 14, between electrical connection and disconnection of the communication control unit 11 with the communication units according to the control by the communication control unit 11. In other words, by switching the switch 16, the communication control unit 11 exclusively selects one of the wired communication unit 12 and the wireless communication unit 13 as a communication unit via which the communication control unit 11 communicates with the external device.

As the control information based on which the communication control unit 11 selects one of the wired communication unit 12 and the wireless communication unit 13, it is possible to use information indicating, for example, whether or not the wired communication unit 12 is linked with another apparatus. If the wired communication unit 12 is linked with the other apparatus, the wired communication unit 12 is invariably selected and the wireless communication unit 13 is electrically separated so as to perform communication using the wired LAN. On the other hand, if the wired communication unit 12 is not linked with the other apparatus, the wireless communication unit 13 may be selected and the wired communication unit 12 may be electrically separated so as to perform communication using the wireless LAN. Note that the above control information used for selecting one of the communication units is a mere example, and a communication unit may be selected based on different control information.

In addition, the communication control unit 11 exchanges information with the PHY 121 of the wired communication unit 12 and the MDIO slave unit 136 of the wireless communication unit 13 via the MDIO/MDC 15. Here, it is possible to distinguish whether the control information is to be exchanged with the wired communication unit 12 or the wireless communication unit 13, by allocating different addresses ("PHY address" in FIG. 2) to the wired communication unit 12 and the wireless communication unit 13. That is to say, it is sufficient as long as each of the wired communication unit 12 and the wireless communication unit 13 responds only to the communication control unit 11 accessing the corresponding address for the control information exchange.

The communication device 20 according to the second embodiment of the present invention having the above configuration is capable of switching the switch 16 according to the respective connection statuses of the communication units. This, as a result, allows communication by selecting one of the wired LAN and the wireless LAN even when the communication control unit 11 is electrically connected to both the wired communication unit 12 and the wireless communication unit 13 via the MII bus.

Thus, a communication device capable of performing the communication only with the wired LAN can use the wired LAN and the wireless LAN while switching between them, without modification to the physical configurations of the communication control unit 11 and the wired communication unit 12.

In addition, the communication control unit 11 and the wireless communication unit 13 transmit and receive frames compliant with the IEEE 802.3 standard even in the case of wireless communication. Therefore, the communication control unit 11 can use, even for the communication via the wireless LAN, the hardware and software used for the communication via the wired LAN. In other words, the processing load of the communication control unit 11 can be reduced as compared to the case where the communication control unit 11 processes frames compliant with the IEEE 802.11 standard.

In addition, the number of connection bus IFs can be reduced as compared to the case where the communication control unit 11 performs the communication via the wireless LAN using the PCI bus as the general-purpose bus or the case where the communication control unit 11 is connected to the wired communication unit 12 and the wireless communication unit 13 using two different IFs. For example, when the communication control unit 11 is configured as a single LSI, the number of IF terminals can be reduced because it is sufficient, number-wise, to have the terminals of only one MII-IF.

In addition, since the communication control unit 11 is capable of exchanging information with both the wired communication unit 12 and the wireless communication unit 13 via a single MDIO/MDC 15, information exchanging units of the communication control unit 11 can be integrated into a single unit, thereby allowing easy software implementation as compared to the case of having a plurality of information exchanging units.

Note that although the second embodiment has shown the example in which two MDIO slaves, namely, the wired communication unit 12 and the wireless communication unit 13, are connected to the communication control unit 11 (MDIO master), it is possible to connect, to the communication control unit 11, the same number of apparatuses as the number of apparatuses to which "PHY addresses" in FIG. 2 can be allocated (i.e. 32 apparatuses). This holds true also for a third embodiment described below.

Third Embodiment

Although the second embodiment has shown the example in which the wired communication unit 12 and the wireless communication unit 13 are separately configured, they may be configured in the same semiconductor integrated circuit (large scale integration: LSI). In the third embodiment of the present invention, a control method using the MDIO/MDC, which is performed when the wired communication unit 12 and the wireless communication unit 13 are included in the same LSI, shall be hereinafter described with reference to the drawings.

Figure 11:
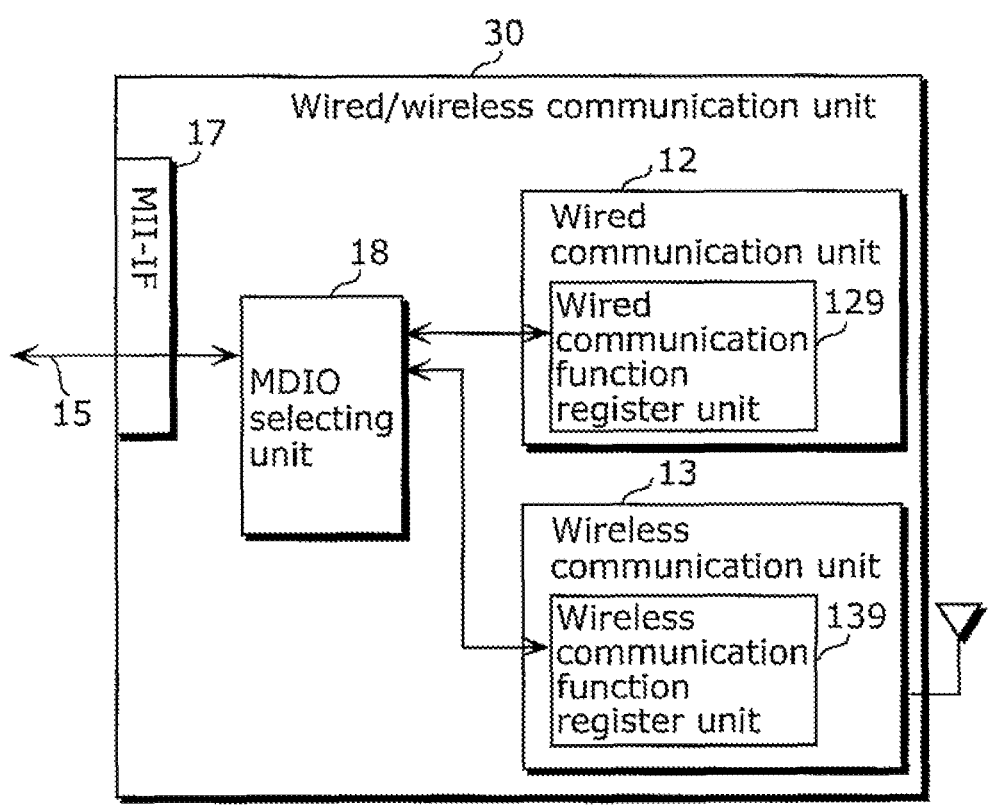
FIG. 11 is a schematic diagram of a communication device according to yet another embodiment of the present invention.

FIG. 11 is a schematic diagram illustrating the configuration outline of a wired/wireless communication unit when the wired communication unit and the wireless communication unit are included in the same LSI according to the third embodiment. Note that the constituent elements having the same configuration as those in the first and second embodiments are given the same reference numerals, and the descriptions thereof shall not be repeated.

A wired/wireless communication unit 30 includes the wired communication unit 12, the wireless communication unit 13, an MII-IF 17, and an MDIO selecting unit 18.

The MDIO selecting unit 18 functions as an instruction assigning unit which assigns, to one of the wired communication unit 12 and the wireless communication unit 13, an instruction transmitted from the communication control unit 11 via the MDIO/MDC 15. As a method by which the MDIO selecting unit 18 distinguishes between the wired communication unit 12 and the wireless communication unit 13, the wired communication unit 12 and the wireless communication unit 13 may be allocated with mutually-different addresses ("PHY addresses" in FIG. 2), for example.

With the wired/wireless communication unit 30 according to the third embodiment of the present invention having the above configuration, the communication control unit 11 (MDIO master) connected to the wired/wireless communication unit 30 can control the control information of the wired communication unit 12 and the wireless communication unit 13 using a single MDIO/MDC 15. This produces, in addition to the advantageous effects described in the second embodiment, an advantageous effect that the wired communication unit 12 and the wireless communication unit 13 can be included in a single LSI.

Note that although the data communication bus 14 is not shown in FIG. 11, a switch as shown in FIG. 10 may be provided in the LSI (between: the MII-IF 17; and the wired communication unit 12 and the wireless communication unit 13), and the communication control unit 11 may select one of the wired communication unit 12 and the wireless communication unit 13 using the switch.

Figure 12:
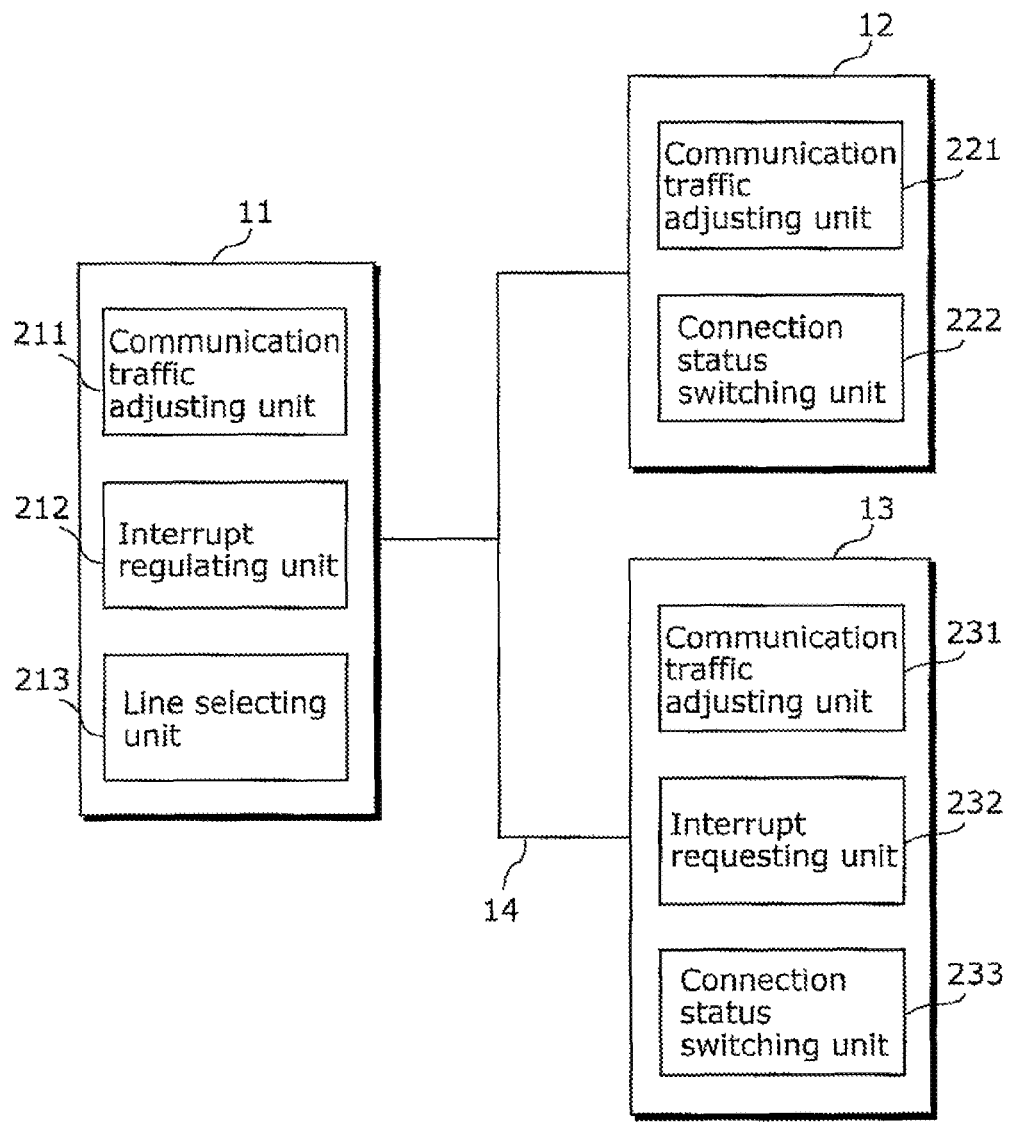
FIG. 12 is a functional block diagram of a communication device.

Next, with reference to FIG. 12, other processing performed between the communication control unit 11 and the wired communication unit 12 and between the communication control unit 11 and the wireless communication unit 13 shall be described. As shown in FIG. 12, the communication control unit 11 includes a communication traffic adjusting unit 211, an interrupt regulating unit 212, and a line selecting unit 213. The wired communication unit 12 includes a communication traffic adjusting unit 221 and a connection status switching unit 222. The wireless communication unit 13 includes a communication traffic adjusting unit 231, an interrupt requesting unit 232, and a connection status switching unit 233.

First, when the wireless communication unit 13 is connected to the data communication bus 14, the rate of communication between the communication control unit 11 and the wireless communication unit 13 via the data communication bus 14 (internal communication rate) differs from the rate of communication between the external device and the wireless communication unit 13 via the wireless LAN (external communication rate). Thus, the communication control unit 11 and the wireless communication unit 13 may exchange a pause frame. The exchange of a pause frame between the communication control unit 11 and the wireless communication unit 13 allows reduction of packet losses in a buffer of the communication control unit 11 or the wireless communication unit 13.

More specifically, a "transmission stop request (equivalent to a pause frame)" and a "transmission resume request" are transmitted and received between the communication traffic adjusting unit 211 of the communication control unit 11 and the communication traffic adjusting unit 231 of the wireless communication unit 13. For example, when the communication status between the wireless communication unit 13 and the access point 5 is unfavorable (the internal communication rate>the external communication rate), the wireless communication unit 13 cannot transmit, to the network, all the data received from the communication control unit 11 via the data communication bus 14. Thus, the communication traffic adjusting unit 231 of the wireless communication unit 13 transmits the "transmission stop request" to the communication traffic adjusting unit 211 of the communication control unit 11 via the data communication bus 14 before the buffer overflows. Here, having received the "transmission stop request", the communication control unit 11 temporarily stops transmitting data to the wireless communication unit 13 via the data communication bus 14.

The communication traffic adjusting unit 231 of the wireless communication unit 13 transmits the "transmission resume request" to the communication traffic adjusting unit 211 of the communication control unit 11 via the data communication bus 14 on the condition, for example, that the communication status between the wireless communication unit 13 and the access point 5 has recovered or the buffer usage has fallen below a threshold. This leads to resumption of data transmission via the data communication bus 14. Note that a time period until the transmission resumption may be included in the "transmission stop request (equivalent to a pause frame)", and after that time period elapses, the communication control unit 11 may resume the transmission without receiving the "transmission resume request".

On the other hand, when the communication rate between the communication control unit 11 and the wireless communication unit 13 falls below the communication rate between the wireless communication unit 13 and the access point 5 (the internal communication rate<the external communication rate), and the like, the communication traffic adjusting unit 211 of the communication control unit 11 transmits the "transmission stop request" and the "transmission resume request" to the communication traffic adjusting unit 231 of the wireless communication unit 13 via the data communication bus 14.

Note that the above processing is applicable not only to an embodiment in which both the wired communication unit 12 and the wireless communication unit 13 are included as the communication units as shown in FIG. 10 and FIG. 11, but also to an embodiment in which only the wireless communication unit 13 is included as the communication unit as shown in FIG. 2.

In addition, the above processing may be performed between the communication traffic adjusting unit 211 of the communication control unit 11 and the communication traffic adjusting unit 221 of the wired communication unit 12. However, since the communication status of the wireless communication has a greater tendency to change than that of the wired communication, performing the above processing between the communication control unit 11 and the wireless communication unit 13 is expected to produce an advantageous effect in particular.

Next, FIG. 13 is a diagram showing a frequency of interrupt by the wireless communication unit 13 when the wireless communication unit 13 is selected (upper half) and a frequency of interrupt by the wireless communication unit 13 when the wired communication unit 12 is selected (lower half). As shown in FIG. 13, the frequency of interrupt related to the control information of the wireless communication unit 13 may be decreased when the wired communication unit 12 is selected and the communication is being performed using the wired LAN.

More specifically, the interrupt requesting unit 232 of the wireless communication unit 13 transmits an interrupt request to the communication control unit 11 at first time intervals (upper half of FIG. 13). Upon selection of the wired communication unit 12 (upon link-up of the wired communication unit 12), the interrupt regulating unit 212 of the communication control unit 11 transmits an "interrupt regulation instruction" to the interrupt requesting unit 232 of the wireless communication unit 13 via the MDIO/MDC 15. Having received the "interrupt regulation instruction", the interrupt requesting unit 232 sets the transmission intervals of the interrupt request to second time intervals that are longer than the first time intervals.

Note that an example of interrupt information is an interrupt notifying a change in the link status, which is a change in the link status between the wireless communication unit 13 and another device. In other words, when the communication status between the wireless communication unit 13 and the access point is unfavorable, interrupts notifying link-up and link-down occur frequently. Thus, by decreasing the frequency of interrupt by the wireless communication unit 13 when the wireless communication unit 13 is not selected, it is possible to reduce the processing load of the communication control unit 11.

In addition, the above processing can be applied not only to the communication device 20 shown in FIG. 10, but also to the wired/wireless communication unit 30 shown in FIG. 11.

Next, as a variation of FIG. 10, the switching function of the switch 16 may be provided to the MII-IF 123 and the MII-IF 134. Specifically, instead of providing the switch 16 on the data communication bus 14, connection status switching units 222 and 233 may be provided to the wired communication unit 12 and the wireless communication unit 13, respectively, and these connection status switching units 222 and 233 may be controlled by a line selecting unit 213 of the communication control unit 11.

More specifically, the line selecting unit 213 transmits a "connection instruction" to the connection status switching unit of one of the wired communication unit 12 and the wireless communication unit 13 and a "disconnection instruction" to the connection status switching unit of the other communication unit. Upon receiving the "connection instruction" from the line selecting unit 213, the connection status switching units 222 and 233 start the data transmission and receiving with the communication control unit 11 via the data communication bus 14 (connected status), whereas upon receiving the "disconnection instruction", the connection status switching units 222 and 233 stop the data transmission and receiving with the communication control unit 11 via the data communication bus 14 (disconnected status).

The above configuration allows the communication control unit 11 to exclusively select one of the wired communication unit 12 and the wireless communication unit 13. Note that the connection status switching units 222 and 233 may be switches each physically connecting or disconnecting the data communication bus 14, or may be means for switching, through software control, whether or not the data transmission and receiving is allowed.

Note that any method may be used for the above processing as long as the wired communication unit 12 and the wireless communication unit 13 can be connected electrically independently of each other. For example, an isolate function specified in the IEEE 802.3 standard can be used for electrically separating the communication units. More specifically, there is a method in which data-communication-related output terminals connected to the respective data communication buses 14 of the wired communication unit 12 and the wireless communication unit 13 (RXD0-3, RX_DV, RX_CLK, RX_ER, TX_ER, and TX_CLK) are put in a high impedance state and the input terminals (TX_EN and TXD0-3) are caused to ignore input data. Note that the output terminals and the input terminals are not limited to those listed above, and TX_CLK and RX_CLK may serve as the input terminals, for example.

Here, the "connection instruction" and "disconnection instruction" in the above processing correspond to the isolate function allocated to the bit 0.10 of the control register shown in FIG. 6, and "0" is set to the bit 0.10 when the "connection instruction" is transmitted, whereas "1" is set to the bit 0.10 when the "disconnection instruction" is transmitted. Conventionally, according to the description of the IEEE 802.3u standard, the bit having an isolate function of the bit 0.10 of the control register has been used for preventing breakage of two devices attachable via an MII (PHY and a device connected to the PHY via an MII) when such two devices are inserted or removed while power is being supplied (at the time of hot insertion or removal). Application of the above to the switching between the wired communication unit 12 and the wireless communication unit 13 allows the communication control unit 11 to be electrically independently connected with the wired communication unit 12 and the wireless communication unit 13. Note that the above isolate function is not limited to being allocated to the bit 0.10, and may be allocated to another bit.

In addition, the above processing can be applied not only to the communication device 20 shown in FIG. 10, but also to the wired/wireless communication unit 30 shown in FIG. 11.

Note that although the first through third embodiments above have illustrated the configuration in which the media independent interface (MII) bus is used as the bus connecting the communication control unit 11 with the wired communication unit 12 and the wireless communication unit 13, it is also possible to use, as a replacement for the MII, a reduced media independent interface (RMII) intended to reduce the number of MII pins, a gigabit media independent interface (GMII) capable of processing at a speed of 1 G bit/second, or a reduced gigabit media independent interface (RGMII) intended to reduce the number of GMII pins.

The communication device having the above configuration is not limited to being included in the television 1, and may also be included in various AV apparatuses (content processing devices) connected to a network, such as a DVD recorder and a Blu-ray disc recorder, to produce the same advantageous effect. For example, the present invention may be realized as a reproduction device including a reproducing unit which reproduces content obtained from an external device via the communication device 10, or a recording device including a recording unit which records content obtained from an external device via the communication device 10. Note that various recording media may be used as the recording medium of the recording unit, such as a Blu-ray disk (BD), a digital versatile disk (DVD), a hard disk drive (HDD), and a nonvolatile memory.

Note that although the present invention has been described based on the above embodiments, it is apparent that the present invention is not limited to such embodiments. The present invention also includes such cases as below.

Each of the devices described above is specifically a computer system including a microprocessor, a read-only memory (ROM), a random-access memory (RAM), a hard disk unit, a display unit, a keyboard, a mouse, and so on. A computer program is stored in the RAM or the hard disk unit. The respective devices achieve their functions through the microprocessor's operation according to the computer program. Here, the computer program is a combination of a plurality of instruction codes indicating instructions for the computer, so that a predetermined function is achieved.

Some or all of the constituent elements of the respective devices may be configured from a single system large-scale integrated (LSI) circuit. The system LSI is a super-multifunction LSI manufactured by integrating a plurality of constituent elements on a single chip, and is specifically a computer system including a microprocessor, a ROM, a RAM, and so on. A computer program is stored in the RAM. The system LSI achieves its function through the microprocessor's operation according to the computer program.

Some or all of the constituent elements of the respective devices described above may be configured as an integrated circuit (IC) card attachable to the respective devices or as a stand-alone module. The IC card or the module is a computer system including a microprocessor, a ROM, a RAM, and so on. The IC card or the module may include the aforementioned super-multifunction LSI. The IC card or the module achieves its function through the microprocessor's operation according to the computer program. The IC card or the module may be tamper-resistant.

The present invention may be realized as the methods described above. In addition, the present invention may be realized as a computer program for executing such methods using a computer, and may also be a digital signal including the computer program.

Moreover, the present invention may also be realized by storing the computer program or the digital signal in a computer-readable recording medium such as a flexible disc, a hard disk, a CD-ROM, a magneto-optical (MO) disk, a DVD, a DVD-ROM, a DVD-RAM, a Blu-ray disc (BD), and a semiconductor memory. Furthermore, the present invention may also be realized as the digital signal recorded on these recording media.

In addition, the present invention may also be realized by transmission of the computer program or the digital signal via a telecommunication line, a wireless or wired communication line, a network represented by the Internet, a data broadcast, and so on.

Moreover, the present invention may also be realized as a computer system including a microprocessor and a memory, in which the memory stores the computer program and the microprocessor operates according to the computer program.

Furthermore, by transferring the program or the digital signal recorded on the recording media, or by transferring the program or the digital signal via the network and the like, implementation using another independent computer system is also possible.

It is also possible to combine the above embodiments and variations.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is advantageously applicable to AV apparatuses including a communication device connectable to a network.

What is claimed is:

1. A communication device which performs data communication with another communication device, said communication device comprising:
a wireless communication unit configured to perform data transmitting and receiving with the other communication device via a wireless network; and
a communication control unit electrically connected with said wireless communication unit via a media independent interface (MII) bus, said communication control unit being configured to control said wireless communication unit using a management data input-output/management data clock (MDIO/MDC) included in the MII bus;
wherein said wireless communication unit includes a register used for the control performed by said communication control unit; and
wherein said register includes a common region and a special region, said common region being used for processing common to wired communication and wireless communication, and the special region being used for processing unique to the wireless communication.

2. The communication device according to claim 1, wherein said register includes: a first register including (i) said common region and (ii) an intermediate region which mediates transmission of a processing request from said communication control unit to said special region; and a second register including said special region, and
said communication control unit is configured to indirectly access said special region via said intermediate region.

3. The communication device according to claim 1, wherein said common region is used for at least one of setting for reset, setting for loopback, setting for power-down, setting for an isolation function, and setting for status of link with an external device.

4. A communication device which performs data communication with another communication device, said communication device comprising:
a wireless communication unit configured to perform data transmitting and receiving with the other communication device via a wireless network; and
a communication control unit electrically connected with said wireless communication unit via a media independent interface (MII) bus, said communication control unit being configured to control said wireless communication unit using a management data input-output/management data clock (MDIO/MDC) included in the MII bus;
wherein said wireless communication unit includes a register used for the control performed by said communication control unit;
wherein said register includes a first register including an intermediate region which mediates transmission of a processing request from said communication control unit; and a second register including a special region used for wireless communication processing; and
wherein said communication control unit is configured to indirectly access said special region via said intermediate region.

* * * * *